United States Patent Office 3,639,659
Patented Feb. 1, 1972

3,639,659
CONTINUOUS EXTRACTION OF GRANULAR POLYAMIDES
Werner Nieswandt, Weinheim, Hermann Linge, Carlsberg, Hans Pirzer, Frankenthal, and Werner Hoerauf and Herbert Hetz, Ludwigshafen, Germany, assignors to Badische Anilin- & Soda-Fabrik Aktiengesellschaft, Ludwigshafen (Rhine), Germany
No Drawing. Filed Mar. 28, 1969, Ser. No. 811,650
Claims priority, application Germany, Mar. 30, 1968,
P 17 70 097.9
Int. Cl. C08g 20/38
U.S. Cl. 260—78 L
4 Claims

ABSTRACT OF THE DISCLOSURE

Process for the continuous extraction of low molecular weight constituents from granular polyamides in an extraction zone in whose upper part the extractant is recycled.

---

The object of the invention is a process for the continuous extraction of low molecular constituents from granular polyamides by treating the polyamides with an extractant.

In the manufacture of molded articles and fibers from polyamides having good mechanical properties it is necessary for the monomeric and low molecular weight constituents to be removed from the crude polymeric material. Several processes are known for extracting monomers and other low molecular weight constituents from granular polyamides with solvents. In industry mainly continuous processes have been used, in which the polyamide granules are treated with solvents, e.g. water in a reaction zone whose length is a multiple of its width, for example 40 to 100 times its width. In these processes the solvent in generally passed through the extraction zone from the bottom to the top. Thus for example a definite quantity of crude granules is introduced at the top of the extraction tower add the same quantity of treated material withdrawn at the bottom of the reaction tower. The water used as extractant is introduced at the bottom and the solution containing the monomers and low molecular weight constituents removed at the top. These processes give rise to problems, since it is difficult to remove the aqueous solution, which has a higher specific weight than water, at the top of the reaction tower and to prevent the solution in the reaction zone from sinking. This is achieved by maintaining a relatively high flow velocity for the extractant. In order to remove a maximum of monomers and low molecular weight constituents from the polyamides with a minimum of extractant it is necessary to build reaction towers that are rather high in relation to their width, which is a costly procedure.

In another process the sinking of the heavier extraction solution at the top of the extraction tower towards the bottom of the tower is counteracted by keeping the zone at the top of the reaction tower at a temperature which is higher than that at the bottom so that a temperaure gradient is set up. This procedure is also attended by difficulties since on account of the relatively low flow velocity local overheating cannot be avoided.

In known methods of continuously extracting granular polyamides with solvents, the efficiency of the process is low with regard to the residence time of the product and solvent consumption.

We have now found that in a process for the continuous extraction of monomers and other low molecular weight constituents from granular polyamides by treating the polyamides in an extraction zone whose length is a multiple of its width with extractants which are passed from the bottom to the top, the difficulties of the known processes do not arise when the extractant or a part thereof is removed in the upper part of the extraction zone at one point and recycled to a point below or above it, care being taken to ensure that the temperature at the base of the extraction zone is 10 to 20° C. lower than at the top.

More specifically the invention relates to a process for the continuous extraction of monomers, dimers, trimers and tetramers contained in granular polyamides by means of an extracting agent selected from the group consisting of water and an alcohol with 1 to 4 carbon atoms in an extraction column where the polyamide is fed to the top and the extracting agent to the bottom of the column by recycling said extractant from a point located $\frac{1}{20}$ to $\frac{1}{2}$ of the column length below the top of the column to a point located from $\frac{1}{20}$ to $\frac{1}{2}$ of the column length above said first point at such a rate that the linear velocity of the total amount of extractant in the recycling zone is 0.3 to 7 cm./sec. with reference to the moving granular polyamide.

It was found that according to this process it is possible with a specific quantity of solvent to extract considerably higher quantities of monomers and other low molecular weight constituents from a specific quantity of granular material than is possible by known processes. Furthermore it is relatively simple in this process to maintain a specific temperature in the upper part of the reaction zone.

Delays in boiling are prevented by the vigorous movement of the solvent, so that in this part the temperature can be brought close to the boiling point.

The process according to this invention is suitable for removing low molecular weight starting materials of the polyamides, in particular mono-, di-, tri-, and tetramers, especially monomeric caprolactam, from granular poly-ε-caprolactam. The starting materials of other polyamides, e.g. dicarboxylic acids and diamides or salts thereof, can also be removed from the polymers. The polyamides advantageously have an average particle diameter in the range of 1 to 5 mm. Such granular polyamides are usually referred to as chips or granules. The polyamides which are particularly suitable for the process according to this invention generally have a molecular weight in the range of 10,000 to 25,000.

It is advantageous to use water or alkanols, preferably alkanols containing 1 to 4 carbon atoms as extractants in the process according to this invention. Water at a temperature somewhat below the boiling point is preferred as extractant. The extraction is carried out at a temperature at which the polymer particles do not fuse together. Thus the temperature range used is advantageously between 60 and 160° C. Naturally it is possible to carry out the extraction at a temperature which is higher than the boiling point at normal pressure of the extractant by carrying out the process at superatmospheric pressure, so that the solvent in the extraction zone does not boil.

The length of the extraction zone should be a multiple of its width. When the cross section is circular, the length should be 5 to 40 times the diameter, in particular 8 to 20 times the diameter. The solvent is fed to the extraction zone at the base and removed at the top. If a tubular extraction tower is used the solvent is advantageously fed in at the bottom of the tower. The flow velocity is generally from 3 to 30 mm./sec., preferably from 5 to 20 mm./sec.

The solvent is recycled in the upper part of the extraction zone. By "upper part" of the extraction zone is meant that section at the top whose volume represents 5 to 50%, preferably 15 to 30%, of the total volume of the extraction zone. According to the process of the invention it is possible to remove the extractant containing the low molecular weight constituents at the top of the column and to recycle this solution to the extraction zone at a point situated some way down the extraction tower. In this case the amount of solvent removed is from one twentieth of, to twice the amount of solvent recycled to the top of the column i.e. the quantity per time unit of the recycled extracting agent is of 0.5 to 20 times the quantity per time unit of the extracting agent entering or leaving the column as a whole. It is however also possible to remove the solution at a specific point some way down the column and to recycle it to the top of the zone. In the latter process the ratio of extractant recycled to extractant removed is preferably from 1:1 to 8:1. Thus, the direction of flow of the recycle extractant may be either up or down the extraction zone. Generally the quantity and flow velocity of the recycle solvent is so adjusted that fluidization of the layer of granular polyamide in the extraction zone is avoided.

Another advantage of the process is that it is possible to keep the solvent containing the monomers and low molecular weight constituents at a specific temperature while it is outside the extraction tower by means of regulatable heating or cooling means. In this manner the temperature in the upper part of the extraction zone can be easily and accurately regulated. It is also possible to filter the recycle solvent outside the tower, so that finely divided material can be removed from the treatment zone.

Naturally it is also possible to add substances such as reducing agents or stabilizing agents to the extractant.

EXAMPLE 200 kg./hour of poly-ε-caprolactam granules having a particle diameter of 2.3 mm. and containing 13% of extractable constituents are continuously supplied to the top of a double-walled, heated, cylindrical extraction vessel made of high-grade steel with a diameter of 1.2 m. and a height of 12 m. At the bottom 175.2 kg./hour of granules, which carry 20 kg. water, are removed. 200 kg./hour of completely demineralized water at a temperature of 83° C. is introduced at the bottom. At the top of the extraction vessel 204.8 kg. of extraction water is withdrawn hourly. At the same time 3 m.$^3$ of extraction water per hour is continuously withdrawn at the top of the extraction tower with the aid of a circulating pump and after passing through a filtration unit and a heat exchanger is returned to the vessel via an immersed tube which terminates 3 m. below the surface of the water. With the aid of the heat exchanger the extraction water which is being recycled is maintained at a temperature of 95° C.

Granules are obtained which after drying have residual content of extractable material of less than 0.6%. The extraction water contains 11.8% of extracted constituents.

If the process is carried out in the same manner but without recycling the extraction water in the upper part of the vessel, the water contains 1 to 2% of extracted constituents.

We claim:
1. In a process for the continuous extraction of monomers, dimers, trimers and tetramers from a moving bed of granular poly-ε-caprolactam by means of an extractant selected from the group consisting of water and an alkanol having 1 to 4 carbon atoms at 60–160° C. in an extraction column, the poly-ε-caprolactam being supplied to the top and the extractant being supplied to the bottom of the column at a temperature 10° to 20° C. below the temperature of the extractant in the top of the column, the improvement which comprises recycling said extractant through the column between a point located 1/20 to 1/2 of the column length below the top of the column to a point located 1/20 to 1/2 of the column length above said first point at such a rate that the linear velocity of the total amount of extractant in the recycling zone is 0.3 to 7 cm./sec. with reference to the moving granular poly-ε-caprolactam.

2. A process according to claim 1 wherein the linear velocity of the extractant entering the column is 0.3 to 3 cm./sec. with reference to the moving granular polylactam.

3. A process according to claim 1 wherein the quantity of extractant recycled per unit time is 0.5 to 20 times the quantity of extractant entering or leaving the column per unit time.

4. A process as claimed in claim 1 wherein the temperature in the bottom of the column is 10–20° C. below the temperature at the top of the column.

References Cited
UNITED STATES PATENTS 3,047,565  7/1962  Braun et al. _____ 260—78

HAROLD D. ANDERSON, Primary Examiner

U.S. Cl. X.R.

260—78 S, 96 R